(12) United States Patent
Bolin

(10) Patent No.: US 7,851,936 B2
(45) Date of Patent: Dec. 14, 2010

(54) WATER CURRENT POWER GENERATION SYSTEM

(75) Inventor: William D. Bolin, Spring, TX (US)

(73) Assignee: Anadarko Petroleum Corporation, The Woodlands, TX (US)

( * ) Notice: Subject to any disclaimer, the term of this patent is extended or adjusted under 35 U.S.C. 154(b) by 224 days.

(21) Appl. No.: 12/252,540

(22) Filed: Oct. 16, 2008

(65) Prior Publication Data

US 2010/0013231 A1   Jan. 21, 2010

Related U.S. Application Data

(60) Provisional application No. 61/135,072, filed on Jul. 16, 2008.

(51) Int. Cl.
*F03B 13/00* (2006.01)
*H02P 9/04* (2006.01)
*F03B 13/10* (2006.01)
*F03B 7/00* (2006.01)
*F03B 17/06* (2006.01)
*B63H 1/38* (2006.01)

(52) U.S. Cl. .............................. 290/54; 290/43; 416/85

(58) Field of Classification Search .................. 290/43, 290/54; 416/85
See application file for complete search history.

(56) References Cited

U.S. PATENT DOCUMENTS

| | | | | |
|---|---|---|---|---|
| 1,886,591 A * | 11/1932 | Rothmund | ................... | 405/86 |
| 2,501,696 A * | 3/1950 | Souczek | ...................... | 290/43 |
| 3,848,464 A * | 11/1974 | Scheipner et al. | ........ | 73/170.29 |
| 3,986,787 A * | 10/1976 | Mouton et al. | ................. | 415/7 |
| 4,383,182 A * | 5/1983 | Bowley | ........................ | 290/43 |
| 4,613,279 A | 9/1986 | Corren et al. | ........... | 415/121.2 |
| 4,850,190 A * | 7/1989 | Pitts | ............................ | 60/398 |
| 4,864,152 A * | 9/1989 | Pedersen | ..................... | 290/53 |
| 4,868,408 A * | 9/1989 | Hesh | ............................ | 290/52 |
| 5,440,176 A * | 8/1995 | Haining | ....................... | 290/54 |
| 6,091,161 A * | 7/2000 | Dehlsen et al. | ............... | 290/43 |
| 6,531,788 B2 * | 3/2003 | Robson | ........................ | 290/43 |
| 6,648,589 B2 | 11/2003 | Williams | ....................... | 415/1 |

(Continued)

FOREIGN PATENT DOCUMENTS

DE       10002092 A1    6/2001

(Continued)

*Primary Examiner*—T. C. Patel
*Assistant Examiner*—Pedro J Cuevas
(74) *Attorney, Agent, or Firm*—Raymond R. Ferrera; Adams and Reese LLP

(57) ABSTRACT

A water current power generation system is provided, including a plurality of flotation tubes joined by a body structure; a plurality of ballast chambers joined by a body structure; a plurality of induction type power generation units disposed within housings associated with one or more of the flotation chambers, ballast chambers and body structure; and a plurality of propellers disposed in mechanical communication with each of the induction type generator units. Methods and means of deploying, positioning, maintaining, controlling and operating the system are also provided, as are detailed descriptions of novel inductor type generators used to obtain power from fast moving water currents, flotation tanks for tensioning the system against a submerged anchoring system disposed on an associated seafloor, and fluid-filled ballast chambers equipped with multiple sub-chambers that lend precision control and continuous adjustability to the system.

15 Claims, 3 Drawing Sheets

U.S. PATENT DOCUMENTS

| | | | | |
|---|---|---|---|---|
| 6,652,221 B1* | 11/2003 | Praenkel | ............... | 415/3.1 |
| RE38,336 E | 12/2003 | Williams | ............... | 60/398 |
| 6,666,664 B2* | 12/2003 | Gross | ............... | 417/423.3 |
| 6,729,840 B2 | 5/2004 | Williams | ............... | 415/3.1 |
| 6,756,695 B2* | 6/2004 | Hibbs et al. | ............... | 290/42 |
| 6,856,036 B2* | 2/2005 | Belinsky | ............... | 290/42 |
| 6,955,049 B2 | 10/2005 | Krouse | ............... | 60/641.7 |
| 7,105,942 B2* | 9/2006 | Henriksen | ............... | 290/55 |
| 7,291,936 B1* | 11/2007 | Robson | ............... | 290/43 |
| 7,307,356 B2* | 12/2007 | Fraenkel | ............... | 290/54 |
| 7,331,762 B2* | 2/2008 | Fraenkel | ............... | 416/85 |
| 7,352,074 B1* | 4/2008 | Pas | ............... | 290/43 |
| 7,438,504 B2* | 10/2008 | Henriksen | ............... | 405/223.1 |
| 7,441,988 B2* | 10/2008 | Manchester | ............... | 405/75 |
| 7,489,046 B2* | 2/2009 | Costin | ............... | 290/43 |
| 7,530,224 B2* | 5/2009 | Fraenkel | ............... | 60/398 |
| 7,530,391 B2* | 5/2009 | Hall et al. | ............... | 166/105 |
| 7,541,688 B2* | 6/2009 | Mackie | ............... | 290/54 |
| 7,682,126 B2* | 3/2010 | Parker | ............... | 415/3.1 |
| 7,726,911 B1* | 6/2010 | Dempster | ............... | 405/210 |
| 7,737,570 B2* | 6/2010 | Costin | ............... | 290/43 |
| 2002/0158472 A1* | 10/2002 | Robson | ............... | 290/43 |
| 2003/0156947 A1* | 8/2003 | Gross | ............... | 417/53 |
| 2005/0029817 A1 | 2/2005 | Gizara | ............... | 290/43 |
| 2006/0266038 A1 | 11/2006 | Krouse | ............... | 60/641.7 |
| 2007/0257492 A1* | 11/2007 | Robson | ............... | 290/54 |
| 2007/0277969 A1* | 12/2007 | Hall et al. | ............... | 166/105 |
| 2008/0012345 A1* | 1/2008 | Parker | ............... | 290/54 |
| 2008/0258465 A1* | 10/2008 | Johnston | ............... | 290/53 |
| 2009/0230686 A1* | 9/2009 | Catlin | ............... | 290/54 |
| 2010/0164230 A1* | 7/2010 | Belinsky et al. | ............... | 290/54 |
| 2010/0232962 A1* | 9/2010 | Bolin | ............... | 416/85 |
| 2010/0264658 A1* | 10/2010 | Torres Martinez | ............... | 290/53 |
| 2010/0264660 A1* | 10/2010 | Suzuki | ............... | 290/54 |

FOREIGN PATENT DOCUMENTS

| | | |
|---|---|---|
| EP | 0931931 A1 | 7/1999 |
| GB | 2225813 A | 6/1990 |

\* cited by examiner

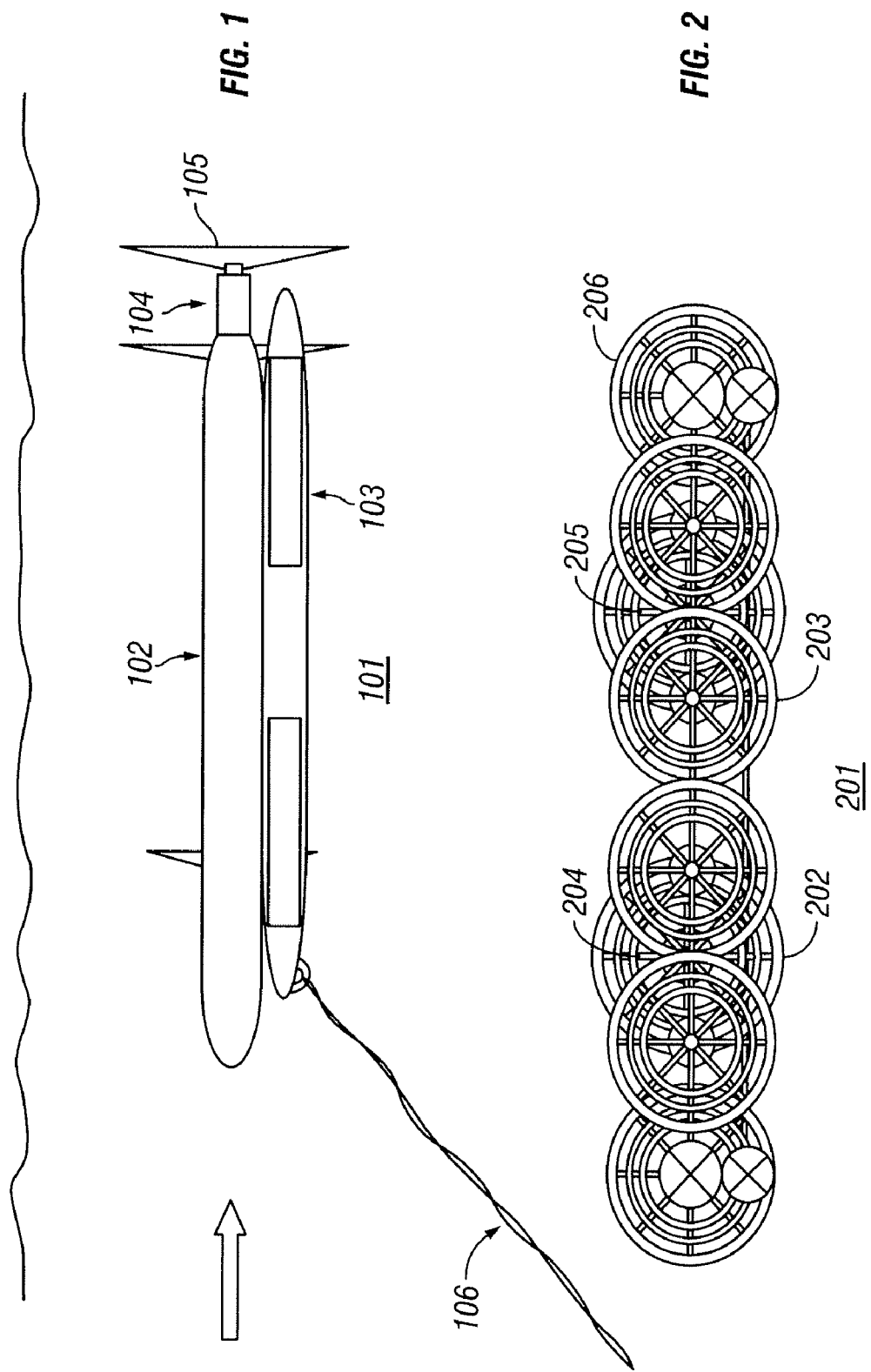

WATER CURRENT POWER GENERATION SYSTEM

CROSS REFERENCE TO RELATED APPLICATIONS

The present application claims the benefit of prior U.S. Provisional Application No. 61/135,072, filed Jul. 16, 2008.

FIELD OF THE INVENTION

The present invention relates generally to renewable energy power generation systems, and in a particular though non-limiting embodiment, to a submerged or waterborne system for generating power derived from fast-moving water currents using an induction type power generator.

BACKGROUND OF THE INVENTION

With the rising cost of fossil fuels and increased energy demand in the world's economies and industries, different and more efficient methods of developing energy sources are constantly being sought. Of particular interest are so-called renewable alternative energy sources, such as battery and solar power devices, windmill farms, and systems deriving power from sequestered hydrogen.

However, such energy sources are not yet capable of delivering power to a widespread area on a commercial scale. Moreover, some proposed technologies, such as hydrogen powered systems involving the refinement of seawater, actually consume more power in the conversion process than is output at the end of the system. Others, such as hydrogen derived from methane, produce equal or greater amounts of fossil fuel emissions as the conventional oil-based technologies they are intended to replace, and still others, such as battery, solar and windmill based systems, require such consistent exposure to significant sunlight or winds that their commercial effectiveness is inherently limited.

One proposed alternative energy system involves the harnessing of hydro power derived from fast moving water currents, for example, currents having peak flow velocities of 2 m/s or more.

In practice, however, existing underwater power generating devices have proven inadequate, even where installed at sites where current velocities are consistently very fast. This is due, at least in part, to both a lack of efficient means for generating the power and for compatibly transferring power obtained from underwater power generating systems to an attendant land or waterborne power relay station.

Existing propeller designs and waterborne power generating mechanisms have also proven to be inadequate, failing to provide either adequate energy generation or sufficient stability against maximum velocity currents.

Another significant problem is the environmental issues associated with obtaining energy from water currents without damaging surrounding aquatic life, such as reefs, marine foliage, schools of fish, etc.

There is, therefore, an important and as yet unmet need for a water current power generation system that overcomes the problems currently existing in the art, and which generates and transfers to a relay station a significant amount of power in a safe, reliable, and environmentally-friendly manner.

SUMMARY OF THE INVENTION

A water current power generation system is provided, including a plurality of flotation tubes joined by a body structure; a plurality of ballast chambers joined by a body structure; a plurality of induction type power generation units disposed within housings associated with one or more of said flotation chambers, ballast chambers and body structure; and a plurality of propellers disposed in mechanical communication with each of said induction type generator units.

BRIEF DESCRIPTION OF THE DRAWINGS

The embodiments disclosed herein will be better understood, and numerous objects, features, and advantages made apparent to those skilled in the art by referencing the accompanying drawings.

FIG. 1 is a side view of a water current power energy generation system according to one example embodiment of the invention.

FIG. 2 is a front view of a water current power energy generation system according to a second example embodiment of the invention.

DETAILED DESCRIPTION OF SEVERAL EXAMPLE EMBODIMENTS

Figure 3:
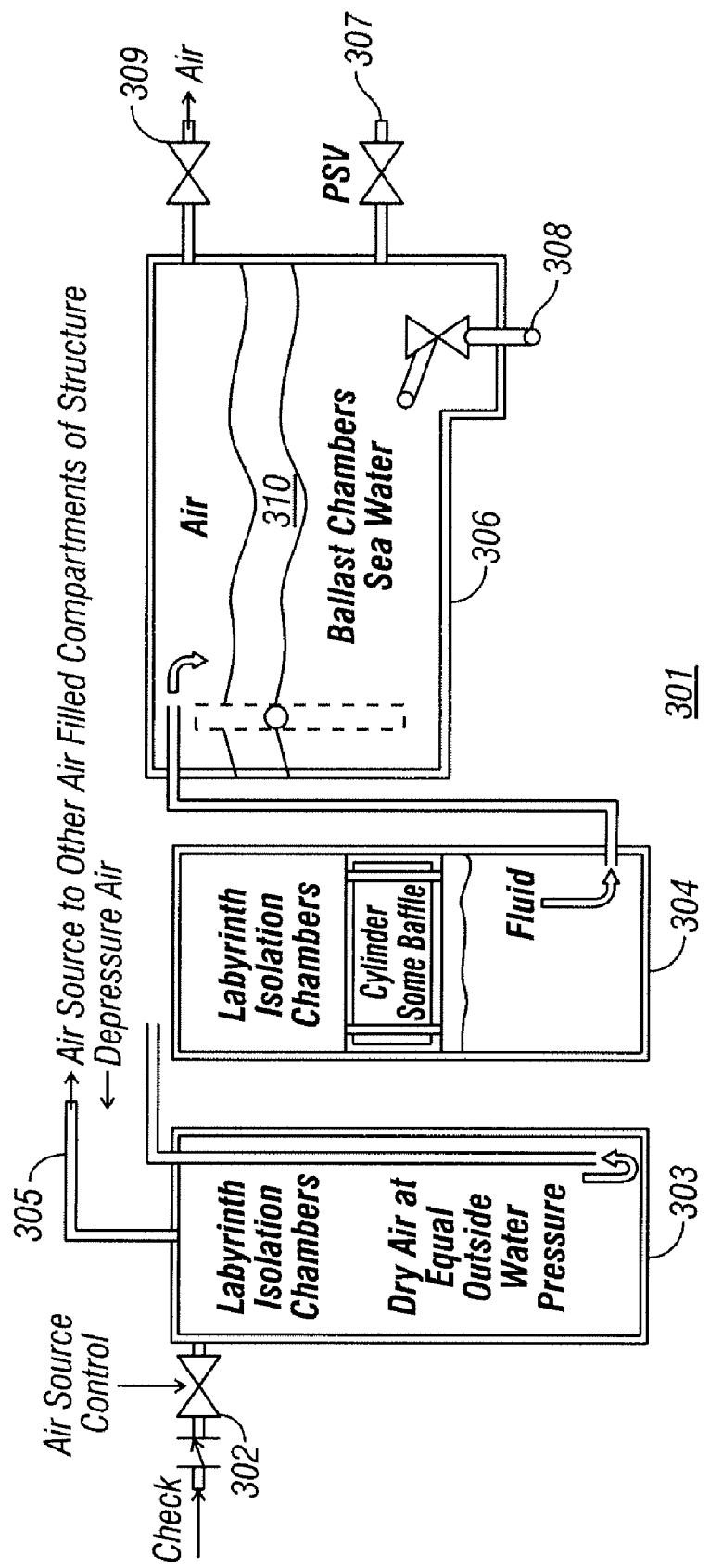
FIG. 3 is a plan view of a ballast tube having a plurality of labyrinth type isolation chambers according to a third embodiment of the invention.

The description that follows includes a number of exemplary system designs and methods of use that embody advantages of the presently inventive subject matter. However, it will be understood by those of ordinary skill in the art that the disclosed embodiments will admit to practice without some of the specific details recited herein. In other instances, well-known sub-sea and power generating equipment, protocols, structures and techniques have not been described or shown in detail in order to avoid obfuscation of the invention.

FIG. 1 depicts a first example embodiment of a water current power generation system 101. In its simplest form, the system comprises a flotation tube 102, a ballast tube 103, and an induction type power generation unit 104 equipped with a propeller 105.

While FIG. 1 appears to depict only a single flotation tube 102, ballast unit 103 and generator component 104, it is in fact a side view of a larger system, and commercial embodiments comprising multiple tubes and generator components are presently contemplated and described below. Nonetheless, those of skill in the pertinent arts will readily appreciate that description of a limited system with singular elements is illustrative, and will not limit the scope of the subject matter disclosed herein.

The novelty of the system lies in the induction type power generation unit 104, which lends simplicity and reliability to operations, and produces power that can be output without transformation as an alternating current (AC) to an associated relay station (not shown). The system is therefore capable of producing AC power on a commercially viable scale that can be easily sold to and used by a neighboring electrical grid.

Generally, induction generators are mechanically and electrically simpler than other types of synchronous electrical power generators or direct current (DC) generators. They also tend to be more rugged and durable, and usually require neither brushes nor commutators.

For example, an electrical three-phase asynchronous (e.g., cage wound) induction machine will, when operated slower than its synchronous speed, function as a motor; the same device, however, when operated faster than its synchronous speed, will function as an induction generator.

In short, induction generators can be used to produce alternating electrical power when an internal shaft is rotated faster than the synchronous frequency. In the present invention, the shaft rotation is accomplished by means of an associated propeller 105 disposed in a relatively fast moving water current.

Power derived from the system will, in most cases, be intended to supplement a neighboring power grid system, and thus the operating frequencies of the grid will dictate the frequency of operation for the power generation system. For example, many large power grid systems currently employ an operating frequency of around 50 or 60 Hertz.

Induction generators are not self-exciting, however, so they require either an external power supply (as could easily be obtained from the neighboring grid using an umbilical run either through the water or beneath an associated seafloor) or else "soft started" by means of a reduced voltage starter in order to produce an initial rotation magnetic flux. Reduced voltage starters can lend important advantages to the system, such as quickly determining appropriate operational frequencies, and permitting an unpowered restart in the event the attendant power grip is deactivated for some reason, for example, as a result of damage caused by a hurricane.

Another important consideration for large waterborne power generating systems is the establishment of a well-balanced flotational equilibrium that allows for continuous dynamic position regardless of surrounding current velocities. Even assuming that surrounding current velocities remain within a predetermined range of acceptable operating velocities, system equilibrium could still be jeopardized by an especially powerful hurricane of the like, but disposition of the system well under the line of typical wave force, i.e., approximately 100-150 feet deep or so, will greatly reduce such disturbances. The various offsetting forces of gravitational kips, flotation kips, drag kips and holding kips will also contribute to the overall stability of a continuous water current energy generating system.

The flotation tube 102 illustrated in FIG. 1 comprises a cylindrical body portion disposed in mechanical communication with at least one end cap unit 104 that houses the aforementioned induction generators. The generators and associated end cap housings contain a drive shaft and, in some embodiments, related planetary gearing for propeller 105.

In some embodiments, flotation tube 102 comprises a cubical or hexagonal shape, though effective practice of the invention will admit to other geometries as well. In a presently preferred embodiment, flotation tube 102 is approximately cylindrical, and pressurized with gas (e.g., air or another safe, buoyant gas) so that, when the system is restrained by anchored tether 106, the combined forces will constitute the primary lifting force for the ocean current energy generating system.

Accordingly, the system can be raised to the surface for maintenance or inspection by turning off the generators, thereby reducing drag on the system, which allows the system to rise somewhat toward the surface. By opening the flotation tube(s) and/or evacuating fluid from the ballast tube(s), the unit can be safely and reliably floated to the surface so that maintenance or inspection can be performed.

According to a method of moving the system, tether 106 can also be released, so that the floating structure can be towed or otherwise powered toward land or another operating site.

The example embodiment depicted in FIG. 2 is a front view of the power generation system 201, equipped with a plurality of relatively large, slow moving propellers 206 disposed in mechanical communication with the shaft members of induction generator units 204 and 205. As seen in greater detail in FIG. 4A, the generator units are disposed within end cap units housed within flotation tubes 102, as well as across the span of a lattice type body portion of the system disposed between the flotation tubes.

Propellers 206 are designed to specification for each particular operation, and improved efficiency will be realized by tailoring the size and curvature of each propeller, etc., based on the operational frequencies required by the induction generators, the speed of surrounding water currents, environmental considerations (e.g., whether the propellers should have openings or voids through which fish or other aquatic life may pass), and so on. Similarly, neighboring sets of propellers can be rotated in opposite directions (e.g., either clockwise or counterclockwise) in order to promote the creation of eddies or dead zones in front of the propellers, which can repel or help protect marine life, enhance propeller rotation efficiency, etc.

Ultimately, the only firm operational requirement for the propellers is that they are capable of rotating associated generator shafts at the speeds required to obtain operational generator frequencies. However, it is highly desirable that the system as a whole remains passive with respect to interaction with local marine life, and optimal performance results can be achieved while still maintaining an environmentally neutral operating environment.

Turning now to FIG. 3, a detailed view of the inside of the ballast tubes previously depicted as item 103 in FIG. 1 is provided, in which a plurality of labyrinth type isolation chambers are joined in such a manner that separation and mixture of various gases and liquids can be used to permit much finer control of the balance and flotational forces present in the system that can be obtained by means of floatation tubes 102.

As seen in the illustrated embodiment, an interior ballast system 301 formed within a ballast tube comprises an air control source 302 disposed in fluid communication with an overpressure check valve and a first isolation chamber 303. First isolation chamber 303 contains both a dry gas (e.g., air having a pressure equal to the surrounding outside water pressure) present in an upper portion of the chamber, and a fluid (e.g., seawater drawn in from outside the isolation chamber) present in a lower portion of the chamber.

First isolation chamber 303 also comprises a secondary air feed line 305 for distributing air to other gas-filled compartments of the structure, as well as lines for mixtures of gas and fluid from first isolation chamber 303 to second isolation chamber 304. Second isolation chamber 304 in turn comprises an upper portion containing air and a lower portion containing water or the like, which are separated by an isolation cylinder. In other embodiments, the isolation cylinder contains sea water upon which floats a barrier fluid in order to ensure better isolation between the air and seawater.

In further embodiments, either of first or second isolation chambers 303, 304 is equipped with instrumentation (e.g., pressure sensors or differential pressure sensors) to determine whether fluid or air is present in a particular cavity of the system. In still further embodiments, such sensors are input into a logical control system (not shown) used to assist in the detection and control of balance and thrust related measurements.

The process of advancing air through the system in upper portions of tanks while ensuring that water or other liquids remain in the lower portions is continued until desired balance and control characteristics are obtained. Ultimately, a final isolation chamber 306 is provided, which, in the depicted embodiment, comprises an air outlet valve 309 used to let air out of the system and, in some circumstances, water into the system.

A pressure safety valve 307 is provided in the event internal pressures become so great that venting of pressure is required in order to maintain the integrity of system control, and an open water flow valve 308 fitted with a screen to prevent accidental entry by sea creatures is disposed in a lower portion of the isolation tank 306.

Again, barrier fluids and the like can be used to reduce interaction between air and water, and if the system is fitted with a float control floating on top of the sea water, the barrier fluid can be retained after all of the sea water is expelled.

Figures 4A, 4B:
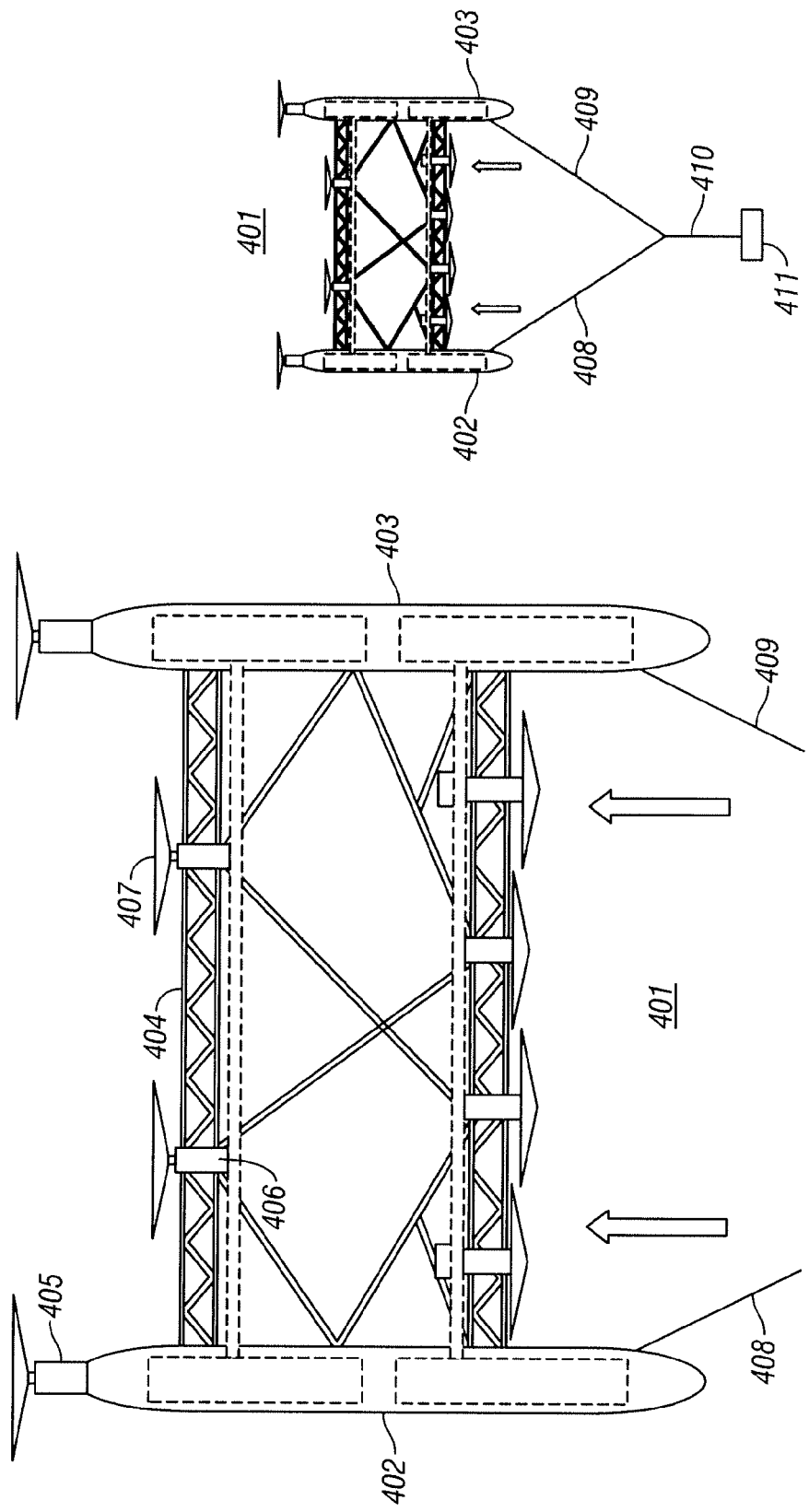
FIG. 4A is a top view of a water current power energy generation system according to a fourth example embodiment of the invention.
FIG. 4B is a top view of the example embodiment depicted in FIG. 4A, further including an associated tether anchoring system.

FIG. 4A presents a top view of one embodiment of the system 401, which in this instance comprises a first and a second flotation tubes 402, 403; a connecting, lattice like body portion 404 disposed therebetween; a plurality of induction generators 405, 406 positioned strategically around the floatation tubes and the body portions; a plurality of propellers 407 disposed in mechanical communication with the generators; and a plurality of tethering members 408, 409 disposed in mechanical communication with the flotation tubes 402, 403.

In the example embodiment depicted in FIG. 4B, tethering members 408 and 409 are joined to form a single anchoring tether 410 that is affixed in a known manner to anchoring member 411.

In various embodiments, anchoring tether 410 further comprises means for variably restraining and releasing the system. In various other embodiments, anchoring tether 410 terminates at an anchoring member 411 equipped with a tether termination device (not shown). Anchoring member 411 comprises any type of known anchor (e.g., a dead-weight anchor or the like) suitable for maintaining a fixed position in fast moving currents, which are usually found in locations with rocky seafloors due to soil erosion caused by the fast moving currents.

In still other embodiments, this portion of the station can be secured by attaching anchoring tether 410 to either a surface vessel or another ocean current energy generating device, or to another central mooring location such as a floating dynamic positioning buoy.

While still other aspects of the invention, which in essence comprise the body of known devices associated with underwater energy production generally (for example, auxiliary power supply sources, fiber optic control and communication systems, attendant remote-operated vehicles used to service the power station, etc.) are certainly contemplated as possible peripherals for use in the deployment, positioning, control and operation of the system, it is not deemed necessary to describe such items in great detail as such systems and subsystems would already be known to those of ordinary skill in the pertinent arts.

While the invention has been depicted and described in detail above with respect to several exemplary embodiments, those of ordinary skill in the art will also appreciate that minor changes to the description, and various other modifications, omissions and additions may also be made without departing from either the spirit or scope thereof.

The invention claimed is:

1. A water current power generation system, said system comprising:
   a submerged flotation chamber, wherein said submerged flotation chamber further comprises a ballast chamber including one or more labyrinth type isolation chambers,
   and wherein one or more of said labyrinth type isolation chambers further comprises a buoyant fluid disposed therein, a buoyant fluid intake valve, a buoyant fluid exit valve, and a buoyant fluid source control means;
   a submerged induction type power generation unit disposed in communication with said flotation chamber; and
   a propeller disposed in communication with said induction type generator unit.

2. The water current power generation system of claim 1, further comprising a plurality of submerged flotation chambers joined by a body structure.

3. The water current power generation system of claim 2, wherein said body structure is disposed in communication with a plurality of induction type generator units.

4. The water current power generation system of claim 3, further comprising a plurality of propellers disposed in communication with said one or more induction type generator units.

5. The water current power generation system of claim 1, further comprising a plurality of ballast chambers.

6. The water current power generation system of claim 5, wherein said plurality of ballast chambers are joined by a body structure.

7. The water current power generation system of claim 1, wherein said buoyant fluid comprises a gas.

8. The water current power generator system of claim 1, wherein said buoyant fluid comprises a liquid.

9. The water current power generation system of claim 1, wherein at least one of said one or more labyrinth type isolation chambers further comprises an upper portion and a lower portion separated by an intermediate cylinder disposed in communication with a barrier fluid.

10. The water current power generation system of claim 1, wherein at least said labyrinth isolation chambers further comprises a pressure safety valve.

11. The water current power generation system of claim 1, wherein at least one of said fluid intake valve and said fluid exit valve is equipped with a screen to prevent entry of marine life into said flotation chamber.

12. The water current power generation system of claim 1, wherein said buoyant fluid source control means further comprises a check valve, which when an over-pressurized state is determined initiates evacuation of buoyant fluid from said one or more isolation chambers.

13. The water current power generation system of claim 1, further comprising at least one tethering member.

14. The water current power generation system of claim 13, wherein said tether terminating member is disposed in communication with an anchoring member.

15. A water current power generation system, said system comprising:
   a plurality of submerged flotation chambers joined by a body structure, wherein said submerged flotation chambers further comprise a ballast chamber having a plurality of labyrinth type isolation chambers,
   and wherein said labyrinth type isolation chambers further comprise a buoyant fluid disposed therein, a buoyant fluid intake valve, a buoyant fluid exit valve, and a buoyant fluid source control means;
   a plurality of submerged induction type power generation units disposed in communication with said submerged flotation chambers; and
   a plurality of submerged propellers disposed in communication with said induction type generator units.

\* \* \* \* \*